3,118,477
PROCESS FOR DECORTICATION OF CONVO-
LUTED NUT KERNELS
Leonard C. Cartwright, New York, N.Y., assignor to
Foster D. Snell, Inc., New York, N.Y., a corporation of
New York
No Drawing. Filed May 23, 1961, Ser. No. 111,917
6 Claims. (Cl. 146—233)

The invention relates to a novel process for the decortication of nut kernels, particularly nut kernels whose surfaces are irregular or convoluted. The invention relates more particularly to the decortication of English walnuts.

Prior to the invention the market for roasted convoluted nut products, particularly English walnuts, has been limited due to problems in commercial roasting methods. The tannins in the pellicle of the nut kernel are hydrolyzed by the hot oil used for roasting to bitter tasting polyhydroxy phenols and render the nut product unacceptable. Moreover, the nut product was not stable and could not be stored. The pellicle could not be removed by mechanical or other usual means due to the convolutions of the kernel.

It is an object of the invention to provide a novel process for the decortication of nut kernels.

It is another object of the invention to provide a decorticated roasted English walnut product which has a good flavor and appearance and tenderness and which is stable during prolonged periods of storage.

These and other objects and advantages of the invention will become obvious from the following detailed description.

The process of the invention comprises immersing the shelled nut kernels in a hot alkali solution having a normality of 0.1 to 1.0 for two minutes or less to loosen the pellicle, spraying the nut kernels with hot water under pressure to remove the loosened pellicle and to wash the alkali from the nut kernel, immersing the nut kernels in a hot dilute acid solution to neutralize any residual alkali before the nut oil is hydrolyzed to soap and spraying the nut kernels with hot water to remove the dilute acid solution. The decorticated nut kernels may then be used for roasting or may be dried and stored.

The process of the invention is applicable to any shelled nut kernels, but is particularly useful for decortication of convoluted nut kernels whose pellicle cannot be removed by mechanical or other means. Examples of suitable convoluted nuts are black walnuts, pecans and English or Persian walnuts (*Juglans regio* L.).

The alkali solution is an aqueous solution of an alkali metal hydroxide such as sodium hydroxide, potassium hydroxide or lithium hydroxide. The alkali solution should have a concentration between 0.1 N to 1.0 N preferably 0.3 N to 0.7 N, and more particularly 0.5 N. If the alkali solution is too dilute, the pellicle is not sufficiently loosened, and if the alkali solution is too concentrated or is immersed too long in the alkali solution, the oil on the surface of the nut kernel will be hydrolyzed and impart a soapy taste to the finished product.

The dilute acid solution is an aqueous solution of an inorganic or organic acid such as hydrochloric acid, hydrobromic acid, sulfuric acid, phosphoric acid, acetic acid, citric acid, lactic acid, maleic acids, malic acid, propionic acid, tartaric acid, etc. The preferred concentration of the acid is 0.1 N although higher or lower concentrations may be used.

It is preferred to employ sodium hydroxide as the alkali and hydrochloric acid, as the acid since sodium chloride, which is formed by the neutralization reaction in this case, is commonly added later for flavoring, and this will aid the salting of the nut product.

The hot water spray should be near boiling and under a high pressure in order to penetrate into all the convolutions of the nut kernels. During the spray treatment, the nut kernels should be agitated such as by tumbling in order to expose all the surfaces of the nut kernels to the spray. The spray not only removes the pellicle but also removes any surface soap that may have been formed in the alkali bath.

A preferred process of the invention for preparing the nuts for roasting comprises immersing the shelled nut kernels in a boiling aqueous solution of 0.5 N sodium hydroxide with agitation for one minute, tumbling and spraying the nut kernels with hot water under high pressure for one-half minute, immersing the sprayed nut kernels in a hot aqueous solution of 0.1 N hydrochloric acid with agitation for one minute, tumbling and spraying the nut kernels with hot water under high pressure for one-half minute, and draining and drying the decorticated nut kernels.

The decorticated nut kernels may then be roasted and salted according to the following method. The nut kernels are blanched in a sodium chloride solution of approximately 9% to 12% concentration for a short period, usually 1 to 2 minutes, and then drained. The nut kernels are then preferably dried to minimize boiling and spattering of the frying oil and are roasted in a hot frying oil having an approximate initial temperature of 390° to 400° F., although higher or lower temperatures may be used. The roasted nuts may then be further salted for individual tastes if desired.

If desired, the decorticated nut product may be eaten raw. It is usually desirable to salt the raw nuts by blanching them in a hot sodium chloride solution. The degree of salting is controlled by the sodium chloride concentration and/or time of immersion in the said solution. After salting, the nut product may be dried, or spray-rinsed and then dried, depending upon whether surface salt is desired or not on the nut products.

In the following examples there are described several preferred embodiments to illustrate the invention. However, it should be understood that the invention is not intended to be limited to the specific embodiments.

*Example I*

500 grams of shelled English walnuts were immersed in boiling 0.5 N sodium hydroxide for one and a half minutes. The walnuts were drained and then rinsed with a high pressure hot water spray for a half minute while tumbling. The nuts were then immersed into a 0.1 N hydrochloric acid solution for one minute, drained and sprayed with hot water for a half minute. All the pellicle was removed from the nut kernels.

The decorticated nut kernels were blanched for one minute in a hot 12% sodium chloride solution and were rinsed with the hot water spray. After drying in the air for three minutes, the nut kernels were roasted in peanut oil at an initial temperature of 390° to 400° F. until golden brown and then drained and lightly salted. The roasted nut product had a good color and taste and could be stored without becoming rancid in a short period of time.

*Example II*

500 grams of shelled English walnuts were immersed in 2.5 liters of a hot 0.1 N sodium hydroxide solution (pH 12.6) for one minute and then were sprayed for one-half minute with water under high pressure. The walnuts were immersed in 0.1 N hydrochloric acid solution for one minute and then sprayed with water again. The walnuts were then blanched in a 9% sodium chloride solution for one minute, drained and dried with hot air for five minutes. Only about 30% of the pellicle was removed from the walnuts. The poor removal was due to the low normality of the sodium hydroxide solution.

*Example III*

Example II was repeated except that a 0.5 N sodium hydroxide solution was used instead of the 0.1 N sodium hydroxide solution. The removal of the pellicle was much better.

*Example IV*

500 grams of shelled English walnuts were immersed in a 0.3 N sodium hydroxide solution for 1.5 minutes with stirring and then rinsed with a high pressure water spray. The walnuts were then immersed in a 0.1 N hydrochloric acid solution for one minute and were again rinsed with the water spray. The walnuts were blanched in a 9% sodium chloride solution for two minutes and then drained. The removal of the pellicle from the walnuts was good.

The walnuts were then roasted in a frying oil having an initial temperature of 410° F. for three minutes and drained. Two grams of fine salt were added to the surface. The walnuts had a good color and taste.

Various modifications of the process of the invention may be made without departing from the scope or spirit thereof and it is to be understood that this invention be limited only as defined in the appended claims.

I claim:

1. A process for decorticating convoluted nut kernels which comprises immersing the shelled nut kernels in a hot alkali metal hydroxide solution having a normality of 0.3 to 0.7 for up to two minutes to loosen the pellicle, tumbling and spraying the nut kernels with hot water under pressure to remove the loosened pellicle and to wash the alkali metal hydroxide solution from the nut kernel, immersing the nut kernels in a hot dilute acid solution having a normality of about 0.1 to neutralize any residual alkali metal hydroxide before the nut oil is hydrolyzed to soap, tumbling and spraying the nut kernels with hot water to remove the dilute acid solution and recovering the decorticated convoluted nut kernels.

2. The process of claim 1 wherein the alkali solution is aqueous sodium hydroxide.

3. The process of claim 1 wherein the dilute acid solution is dilute hydrochloric acid.

4. The process of claim 1 wherein the alkali solution is aqueous sodium hydroxide having a normality of 0.5.

5. The process of claim 1 wherein the nut kernels are English walnuts.

6. A process for decorticating English walnuts which comprises immersing shelled English walnuts in a boiling aqueous solution of 0.5 N sodium hydroxide with agitation for one minute, tumbling and spraying the walnuts with hot water under high pressure for one-half minute, immersing the sprayed walnuts in a hot aqueous solution of 0.1 N hydrochloric acid with agitation for one minute, tumbling and spraying the walnuts with hot water under high pressure for one-half minute, and recovering the decorticated walnuts.

References Cited in the file of this patent

UNITED STATES PATENTS

| 1,887,256 | Bizzell | Nov. 8, 1932 |
| 2,273,183 | Edes | Feb. 17, 1942 |